United States Patent [19]
Ward

[11] Patent Number: 5,279,391
[45] Date of Patent: Jan. 18, 1994

[54] DRY SUMP MECHANICAL TRANSMISSION

[75] Inventor: Harold R. Ward, Farmington Hills, Mich.

[73] Assignee: Eaton Corporation, Cleveland, Ohio

[21] Appl. No.: 13,267

[22] Filed: Feb. 3, 1993

[51] Int. Cl.$^5$ ................................................ F01M 9/00
[52] U.S. Cl. ...................... 184/6.12; 184/26; 74/467
[58] Field of Search ............ 184/6.12, 27.1, 26, 184/31; 475/159; 74/467, 468

[56] References Cited

U.S. PATENT DOCUMENTS

| | | | |
|---|---|---|---|
| 2,214,485 | 9/1940 | Short | 184/6.12 |
| 2,995,211 | 8/1961 | Cohen | 184/6.12 |
| 3,738,452 | 6/1973 | Hausinger | 184/6.12 |
| 4,356,889 | 11/1982 | Teeter | 184/6.12 |
| 4,432,251 | 2/1984 | Malott | 74/337.5 |
| 4,644,815 | 2/1987 | Kawano et al. | 74/467 |
| 4,721,185 | 1/1988 | Weigle | 74/467 |
| 4,754,665 | 7/1988 | Vandervoort | 74/745 |
| 4,914,968 | 4/1940 | Diermeirer et al. | 74/467 |
| 5,005,437 | 4/1991 | Furer et al. | 74/467 |

FOREIGN PATENT DOCUMENTS

| | | | |
|---|---|---|---|
| 0239046 | 7/1964 | Fed. Rep. of Germany | 184/6.12 |
| 0018160 | 2/1981 | Japan | 184/6.12 |
| 0401146 | 11/1933 | United Kingdom | 184/6.12 |
| 0770502 | 3/1957 | United Kingdom | 184/6.12 |

OTHER PUBLICATIONS

Ball Bearing Journal Special '89, pp. 22-27.

Primary Examiner—Thomas E. Denion
Attorney, Agent, or Firm—H. D. Gordon

[57] ABSTRACT

An improved lubrication system for a vehicular mechanical transmission (10) is provided. The transmission gearing (22-34) rotates in a dry sump (11) in the housing (12) and a reservoir (40) provides a sump of lubricant (42) below the level of the gearing. A pump (44) pumps lubricant from the reservoir through a filter (48) and into a distribution manifold (50) for filtered lubrication of the bearings (20) and/or other transmission elements.

4 Claims, 1 Drawing Sheet

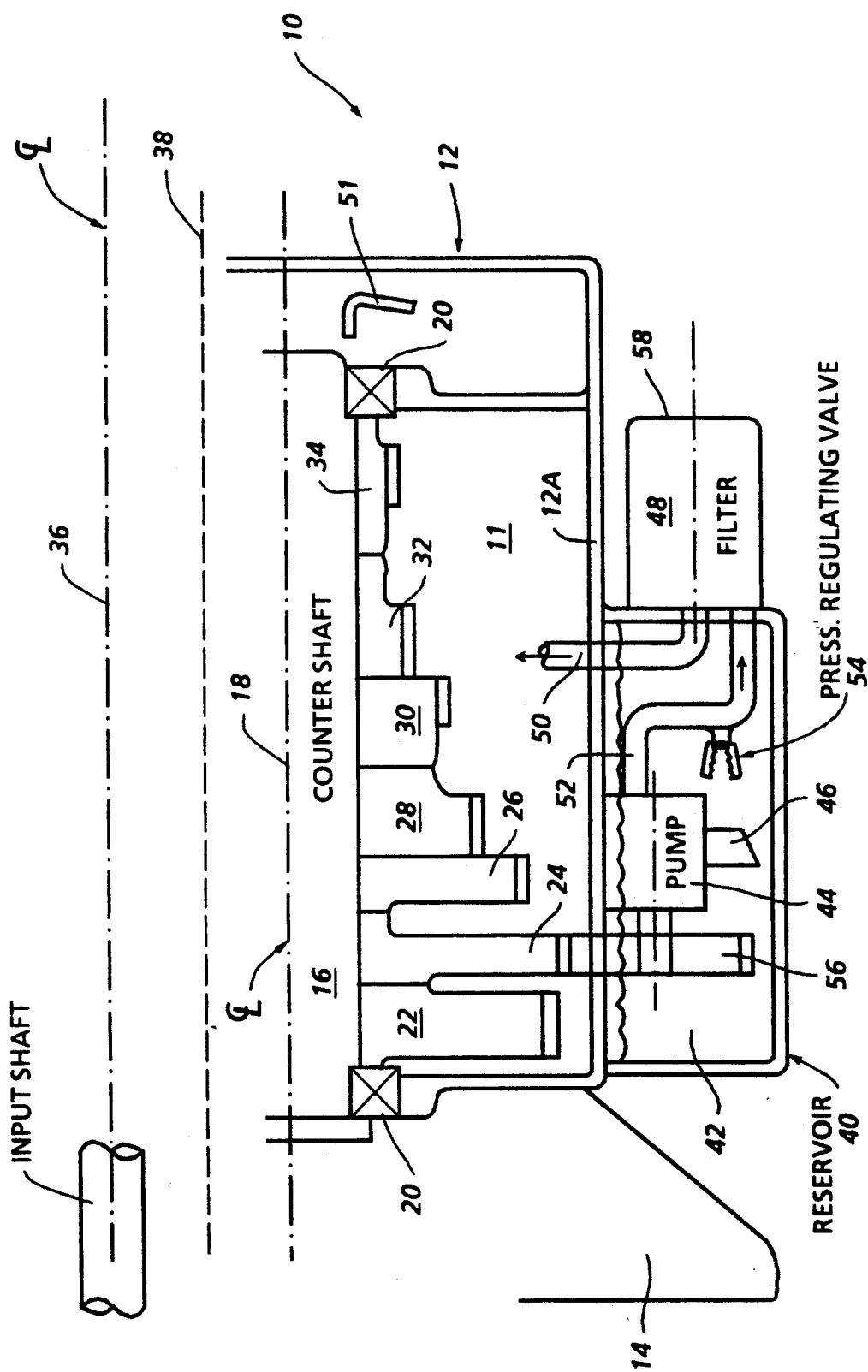

DRY SUMP MECHANICAL TRANSMISSION

BACKGROUND OF THE INVENTION

1. Field of the Invention

The present invention relates to a lubrication system for a change gear transmission and, in particular, relates to a lubrication system for a change gear transmission wherein an oil reservoir is maintained separated from, preferably below, the transmission gearing to eliminate or minimize churn losses and lubricant is pumped through an easily accessible filter to necessary points for spraying of bearings and the like.

2. Description of the Prior Art

Change gear mechanical transmissions, i.e. transmissions utilizing positive jaw clutches to selectively engage and disengage selected gears to shafts, are well known in the prior art. Examples of such transmissions may be seen by reference to U.S. Pat. Nos. 4,805,471; 4,432,251 and 4,754,665, the disclosures of which are incorporated herein by reference. Lubrication of key points of such transmissions, especially the bearings, is critical to the life, capacity and performance of such transmissions, especially those transmissions intended for heavy duty vehicles. The prior art Transmissions typically include a lubricant sump in which a portion of the gearing constantly rotated for purposes of a splash and/or slinging type of lubrication system. The prior art also included pressurized lubrication systems wherein added pumps and/or the pumping action of bearings was utilized to supplement the splash/slinging lubrication systems, see U.S. Pat. Nos. 4,644,815; 4,914,968; 5,005,437 and 4,356,889, the disclosures of which are incorporated herein by reference.

The prior art transmissions, while very commercially successful, were not totally satisfactory as splash/sling lubrication systems may not provide sufficient lubrication/cooling under certain sever operating conditions, all lubricant was not continuously filtered, the combined churning and pumping losses were excessive and/or cleaning or replacing of the filter element was difficult.

SUMMARY OF THE INVENTION

According to the present invention, the drawbacks of the prior art are minimized or overcome by the provision of a pressurized transmission lubrication system for mechanical change gear transmissions which assures proper lubrication/cooling under several operation conditions, assures constant filtering of lubricant sprayed on bearings, requires no more power losses than a conventional splash/sling system and allows easy access to the filter element for cleaning or replacement thereof.

The above is accomplished by allowing the transmission gearing to run in a "dry sump" to minimize or eliminate churning losses, estimated at about three to five horsepower (3 to 5 HP) in an 1100 lbs.-ft. input torque capacity mechanical transmission. A lubricant reservoir is located below the gearing to collect lubricant running off the bearings, gears and shafts and a positive pump is driven by the input gearing to pump lubricant through a filter and then to various spray apertures/nozzles for application to bearings, gear meshes or the like. The pump will use an amount of power substantially equal to the churn losses of the prior art and the filter includes a filtering element which is preferably easily accessible from the exterior of the transmission.

Accordingly, it is an object of the present invention to provide a new and improved lubrication system for a mechanical change gear transmission.

This and other objects and advantages of the present invention will become apparent from a reading of the detailed description of the invention taken in connection with the drawing.

BRIEF DESCRIPTION OF THE DRAWING

The drawing is a partial sectional view of a vehicular mechanical transmission illustrating the improved lubrication system of the present invention.

DESCRIPTION OF THE PREFERRED EMBODIMENT

The drawing illustrates the lower portion of a vehicular mechanical transmission 10 of the type disclosed in greater detail in above-mentioned U.S. Pat. Nos. 4,805,471; 4,432,251 and 4,754,665. Transmission 10 includes a transmission housing 12 to which mounts a clutch housing 14. At least one countershaft 16 having an axis or centerline 18 is mounted in the housing for rotation therein by means of bearings 20. Countershaft 16 carries a plurality of countershaft gears 22, 24, 26, 28, 30, 30, 32 and 34 for rotation therewith. Typically, gear 22 will constantly mesh with an input gear (not shown) fixed to the input shaft, gear 24 will be a PTO gear, gears 26, 28, 30 and 32 will mesh with mainshaft gears (not shown) which are selectively clutchable, one at a time, to a transmission mainshaft/output shaft (not shown) while gear 34 will mesh with a reverse idler (not shown) which is meshed with a reverse mainshaft gear (not shown). Axis/centerline 36 indicates the relative position of the transmission input shaft and mainshaft (not shown), which are usually substantially coaxial, relative to the countershaft 16.

In the prior art, transmissions of the type illustrated in the drawing will be provided with a lubricant sump, indicated by dotted line 38, in which much of the transmission gearing will rotate. In such system, the splashing and slinging action of the gears was relied upon to direct lubricant to the bearings and other required locations. Troughs and like were also utilized to collect and direct the splashed/slunge lubricant and lubricant pumps were utilized to supplement the system. In relatively heavy duty vehicles, the churning of the gears in the lubricant sump can result in a loss of about three to five horsepower (3 to 5 HP).

The prior art mechanical transmission lubrication systems were not totally satisfactory as there was no assurance that the lubricant was properly filtered prior to application onto the bearings, both churning and pumping losses were, in total, higher than desirable and/or the filtering elements were not easily accessible for cleaning/replacement purposes.

According to the present invention, a lubricant reservoir 40 is defined by housing 12 below the level of the transmission gearing. Reservoir will collect lubricant 42 and will communicate with the inlet 46 of a pump 44 which will pump lubricant under pressure through a filter 48 and then into a manifold 50 for distribution to apertures/nozzles 51 at the bearings for spray or drip application. The outlet 52 of the pump may include a pressure regulating valve or the like. Pumps sufficient to provide positive lubricant flow in a heavy duty vehicular transmission are known and usually require an amount of power generally equal to the churning losses (3 to 5 HP) associated with the prior art.

In the illustrated embodiment, pump 44 is driven by a gear 56 meshed with PTO gear 24. Filter 48 extends outwardly from the reservoir 40 and preferably includes an easily removable cover 58 allowing easy access to the filtering elements (not shown) for cleaning or replacement thereof.

Accordingly, the vehicular mechanical transmission lubrication system of the present invention provides a positive flow of filtered lubricant to the bearings 20 and the like. Clean lubricant to the bearings is believed to dramatically increase the life of bearings and also of gearing. Preferably, the filter 48 will have elements capable of filtering all matter of three (3) microns or larger from the lubricant pumped therethrough.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. A lubrication supply system for a vehicular mechanical change gear transmission (10) comprising a transmission housing (12) defining a cavity (11) in which transmission gearing (22-34) driven by an input shaft rotates, said housing including a bottom wall (12A) generally parallel to an axis (36) of said input shaft defining a bottom of said cavity said gearing defining one or more gears fixed for rotation on a shaft (16) having an axis (18) generally parallel to the axis (36) of said input shaft and defining a lowest transmission gearing in said housing, said lubrication system characterized by:

a lubricant reservoir (42) located below said bottom wall and in fluid communication with said cavity for collecting lubrication within said transmission, a pump (44) located within said reservoir, driven by said input shaft and having an inlet 46 communicating with said reservoir and an outlet (52) communicating with a lubricant distribution manifold (50) for distributing lubrication within said housing;

a filter (48) connected in series between said outlet (52) and said manifold (50) whereby all lubricant pumped by said pump (44) to said manifold (50) passes through said filter (48) and said transmission being provided with a known volume of lubricant, all of said lubricant receivable in said reservoir and cavity below the level of the lowest transmission gearing whereby none of said transmission gearing rotates in a lubricant sump.

2. The system of claim 1 wherein said pump is driven by a gear (56) constantly meshed with one of said gears (24) comprising said transmission gearing.

3. The system of claim 1 wherein said filter (48) includes a removable cover member (58) accessible from the exterior of said housing and said reservoir.

4. The system of claim 2 wherein said filter (48) includes a removable cover member (58) accessible from the exterior of said housing and said reservoir.

* * * * *